(12) United States Patent
Chen

(10) Patent No.: US 9,663,185 B2
(45) Date of Patent: May 30, 2017

(54) BICYCLE PEDAL WITH CADENCE SENSOR

(71) Applicant: Chung-I Chen, Taichung (TW)

(72) Inventor: Chung-I Chen, Taichung (TW)

( * ) Notice: Subject to any disclaimer, the term of this patent is extended or adjusted under 35 U.S.C. 154(b) by 0 days.

(21) Appl. No.: 14/749,650

(22) Filed: Jun. 25, 2015

(65) Prior Publication Data

US 2016/0375953 A1    Dec. 29, 2016

(51) Int. Cl.
*B62M 3/08* (2006.01)
*B62M 3/16* (2006.01)
*G01P 3/481* (2006.01)

(52) U.S. Cl.
CPC ............... *B62M 3/08* (2013.01); *B62M 3/16* (2013.01); *G01P 3/481* (2013.01)

(58) Field of Classification Search
CPC ... B62M 3/08; B62M 3/16; G01P 3/44; G01P 15/02
See application file for complete search history.

(56) References Cited

U.S. PATENT DOCUMENTS 8,961,191 B2 *   2/2015   Hanshew ............... H01R 39/64
                                                        439/21
2011/0067503 A1 *  3/2011  Roudergues ............ G01L 5/161
                                                       73/862.51

FOREIGN PATENT DOCUMENTS

FR    WO 2014184485 A1 *  11/2014  ............. B62M 3/08

* cited by examiner

*Primary Examiner* — Vicky Johnson
(74) *Attorney, Agent, or Firm* — Rosenberg, Klein & Lee

(57) ABSTRACT

A bicycle pedal with cadence sensor is disclosed and comprises a pedal shaft, a frame, and a cadence sensor. The pedal shaft is fastened at a crank of a bicycle. The frame is pivotably installed at the pedal shaft. The cadence sensor is arranged at the frame and the cadence sensor includes a G-sensor and a power supply coupled to the G-sensor. The cadence sensor is arranged at the frame. The cadence sensor is cooperating with the frame and the cadence information may be gained through the G-sensor. The cadence information may be transmitted to a bicycle computer or a smart mobile device. A cadence data may be resulted by program operation. The cadence data may be provided to analyze and apply.

8 Claims, 4 Drawing Sheets

BICYCLE PEDAL WITH CADENCE SENSOR

BACKGROUND OF THE INVENTION

1. Field of the Invention

The present invention relates to a pedal of bicycle, and especially relates to a bicycle pedal with a cadence sensor which the rotational speed of the pedal may be gained by the cadence sensor to analyze and calculate.

2. Description of Related Art

The key of start, speed control, and energy development of bicycle is how to efficiently control the rotational speed of the pedal. The control of the rotational speed (or cadence) is not only for the training item of professional riders, but also for any other riders because the bicycle has become the common tool for instead of walk, exercising, leisure time, and entertainment. Efficient control of cadence is contributive to the control of the speed and kinetic energy of bicycle, and further modulation of the strength, muscular endurance, and cardiovascular fitness.

The cadence may be gained by the electric elements. The cadence information may be further transmitted to any program system to analyze and calculate. A conventional cadence detection method is that a magnet is tied or attracted at a crank and a sensor is fastened at a frame for detecting the magnet. The sensitivity is determined by the distance between the magnet and the sensor. If the distance is too far, the sensitivity is low. If the distance is too close, the magnet and the sensor may be collided each other. Besides, the magnet is easily shifted by the external force or the centrifugal force of the rotation of the crank to result in detection fail due to tying with band or attracting at the crank.

In view of the foregoing circumstances, the inventor has invested a lot of time to study the relevant knowledge, compare the pros and cons, research and develop related products. After quite many experiments and tests, the "a bicycle pedal with a cadence sensor" of this invention is eventually launched to improve the foregoing shortcomings, to meet the public use.

SUMMARY OF THE INVENTION

The above mentioned cadence detection method is hard to firmly fastened and positioned the magnet and the sensor in structure. There are also the problems in gaining cadence information which are low sensitivity and detection fail. Therefore, a bicycle pedal with a cadence sensor is provided for gaining the cadence information and solving the above mentioned problems.

In order to achieve above objectives, a bicycle pedal with a cadence sensor is provided. The bicycle pedal with a cadence sensor may comprise a pedal shaft, fastened at a crank of a bicycle; a frame, pivotably installed at the pedal shaft; and a cadence sensor, arranged at the frame, the cadence sensor includes a G-sensor and a power supply coupled to the G-sensor.

In some embodiments, the cadence sensor is arranged at a receiving portion formed at a peripheral of the frame.

In some embodiments, the receiving portion is arranged at an end portion of an axle of the frame.

In some embodiments, the receiving portion is arranged in a frame body of the frame.

In some embodiments, the receiving portion is arranged at one side of the frame body.

In some embodiments, the receiving portion is covered by a stopper.

In some embodiments, the stopper is screwed with an opening of the receiving portion.

In some embodiments, the cadence sensor is arranged in a stopper, and the stopper is covered on a receiving portion of the frame.

In some embodiments, a space is formed inside the stopper, an opening of the space is arranged at an end portion of the stopper, a pair of embedding members is arranged at the end portion, and the cadence sensor is arranged in the space of the stopper and part of the cadence sensor is embedded at the embedding members.

In some embodiments, the stopper is screwed with a receiving portion of the frame.

The cadence sensor is arranged at the frame. The cadence sensor is cooperating with the frame and the cadence information may be gained through the G-sensor. The cadence information may be transmitted to a bicycle computer or a smart mobile device. A cadence data may be resulted by program operation. The cadence data may be provided to analyze and apply.

The cadence sensor is firmly fastened inside the frame for protecting from external force or physical environment. The response of the cadence sensor corresponding to the operation of the pedal is higher and the service life of the cadence sensor is longer.

The receiving portion for receiving the cadence sensor may be realized on the pedal or the stopper with general skills, even applying to the professional or general pedals.

The receiving portion and the stopper is realized to install the cadence sensor in the pedal, and the battery (power supply) or the G-sensor is convenient to be installed and replaced.

The various objectives and advantages of the present invention will be more readily understood from the following detailed description when read in conjunction with the appended drawing.

DETAILED DESCRIPTION OF THE INVENTION

Figure 1:
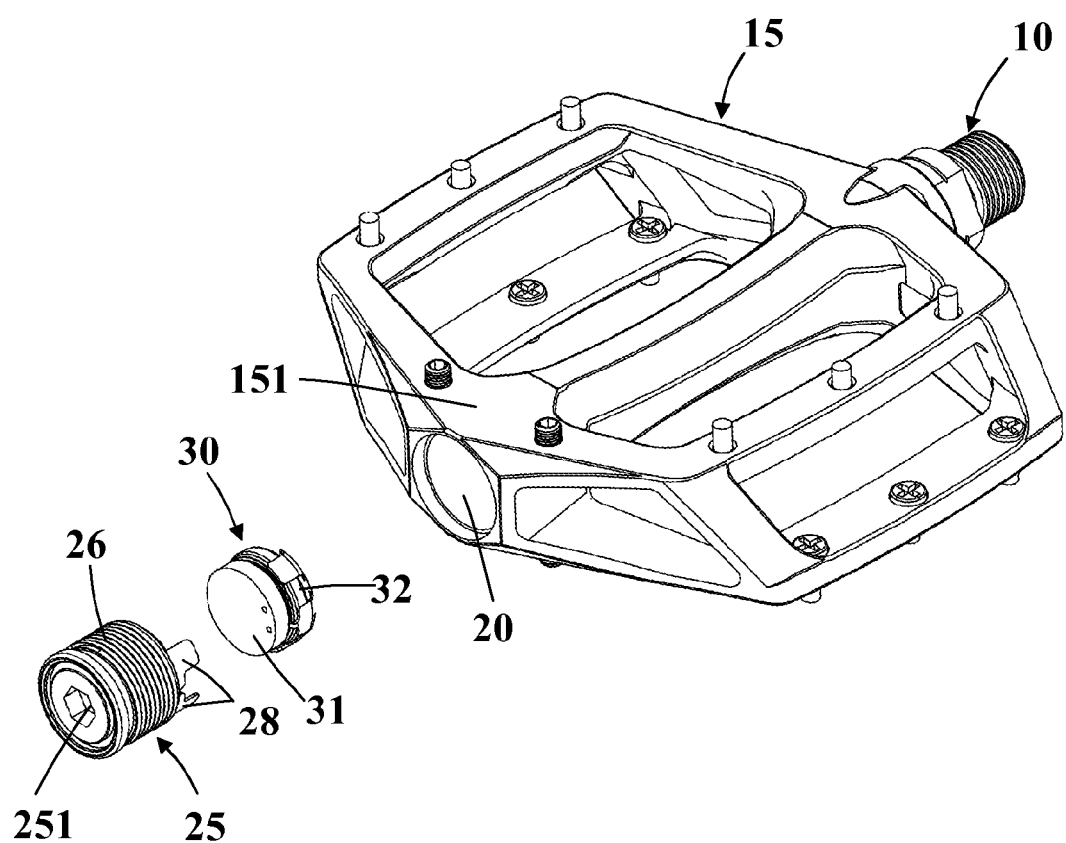
FIG. 1 is an exploded view of a first embodiment of a bicycle pedal with cadence sensor of the present invention.

To describe clearly that the present invention achieves the foregoing objective and function, the technical features and desired function are described with reference to a preferred embodiment and accompanying drawings.

Please reference to FIGS. 1 to 6, a first embodiment and a second embodiment of the bicycle pedal with cadence sensor commonly comprise a pedal shaft 10, a frame 15, and a cadence sensor 30. The pedal shaft 10 may be fastened at a crank of a bicycle. The frame 15 may be pivotably installed at the pedal shaft 10. The cadence sensor 30 may be arranged at a peripheral of the frame 15. The cadence sensor 30 may include a G-sensor 31 and a power supply 32 which is coupled to the G-sensor 31. The peripheral means an off tread surface of the frame 15. G-sensor 31 is packaged in the button-shaped shell with the micro-processor and the wireless transmitter. The power supply 32 may be a button-shaped battery which is changeable.

Figure 2:
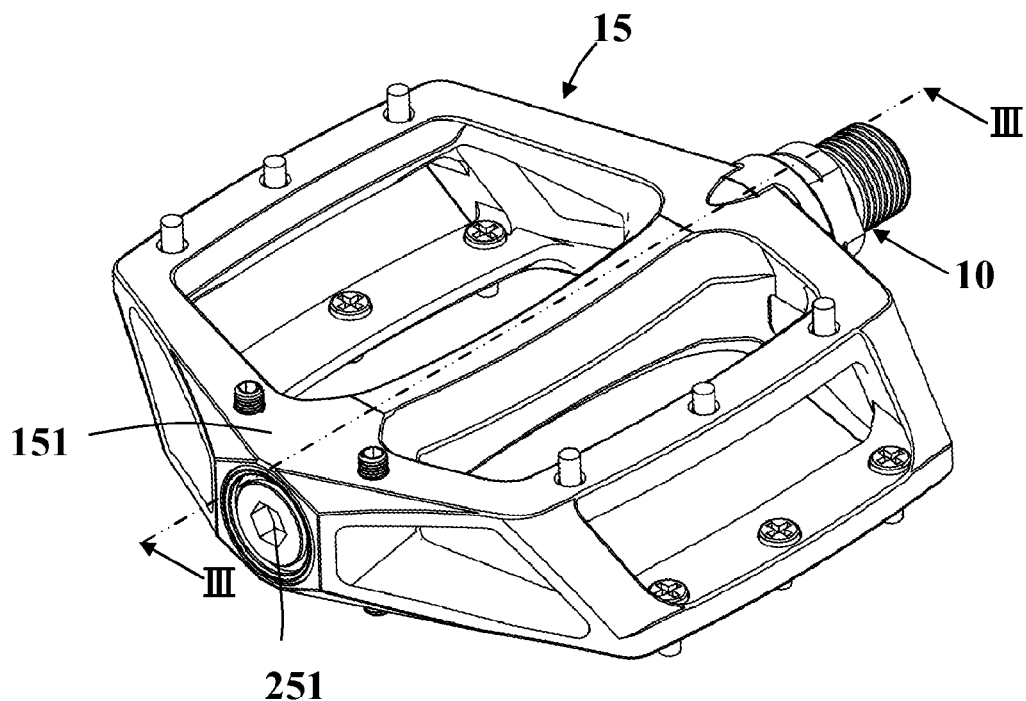
FIG. 2 is a perspective view of the first embodiment of the bicycle pedal with cadence sensor of the present invention.
Figure 3:
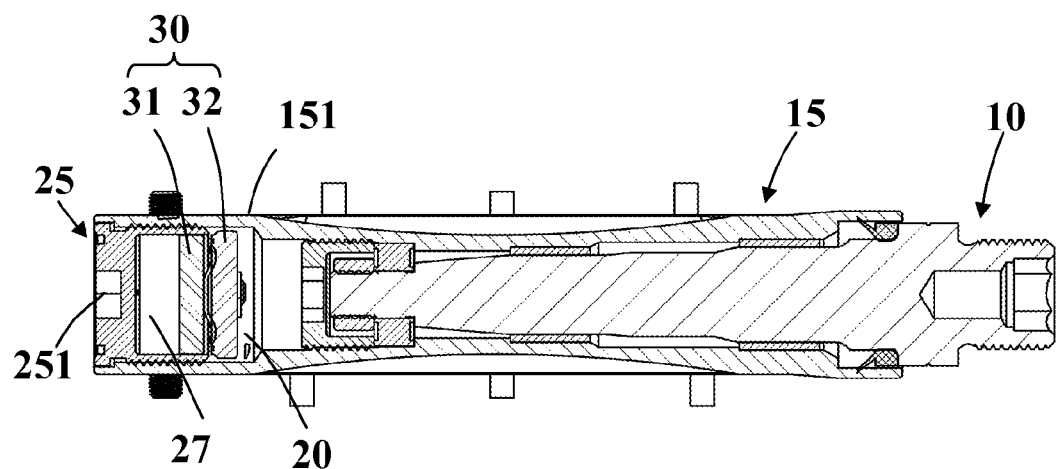
FIG. 3 is a cross-sectional view of the first embodiment of the bicycle pedal with cadence sensor of the present invention.

Please refer to FIGS. 1 to 3, the cadence sensor 30 is arranged at the frame 15 with a first manner. The frame 15 has a receiving portion 20 for receiving and connecting a stopper 25. The receiving portion 20 is arranged at a hole or groove formed at an axle of the frame 15. A space 27 may be formed inside the stopper 25. An outer wall of the stopper 25 and an inner wall of the receiving portion 20 have the cooperating threads 26. A first end of the stopper 25 is a tool operation portion 251 and a second end of the stopper 25 is an opening of the space 27. A pair of embedding members 28 is arranged at the second end of the stopper 25. Each embedding member 28 is similar to the leaf spring structure. Several leaf springs 28 are cooperated with one another to concentrate in a center direction. The cadence sensor 30 is received in the space 27 of the stopper 25 and part of the cadence sensor 30 is located at an opening of the space 27 so that the cadence sensor 30 is embedded by the embedding members 28 to ensure the cadence sensor 30 is firmly fastened in the stopper 25. A hand tool transmits a rotation force to the stopper 25 through the tool operation portion 251 so that the stopper 25 is screwed in the receiving portion 20 with the threads 26 and further achieve the objective of installing the cadence sensor 30 in the frame 15.

Please refer to FIGS. 1 to 3, the cadence sensor 30 is also arranged at the frame 15 with a second manner. The cadence sensor 30 may be arranged in the receiving portion 20. The stopper 25 is screwed in the receiving portion 20 with the threads 26 and then covered the receiving portion 20.

Figure 4:
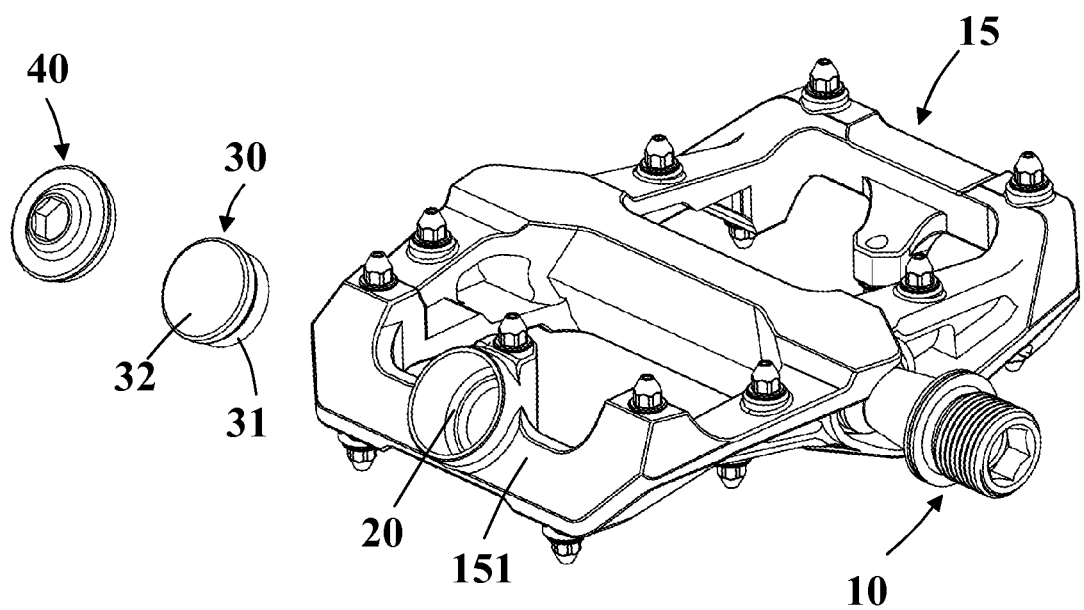
FIG. 4 is an exploded view of a second embodiment of a bicycle pedal with cadence sensor of the present invention.
Figure 5:
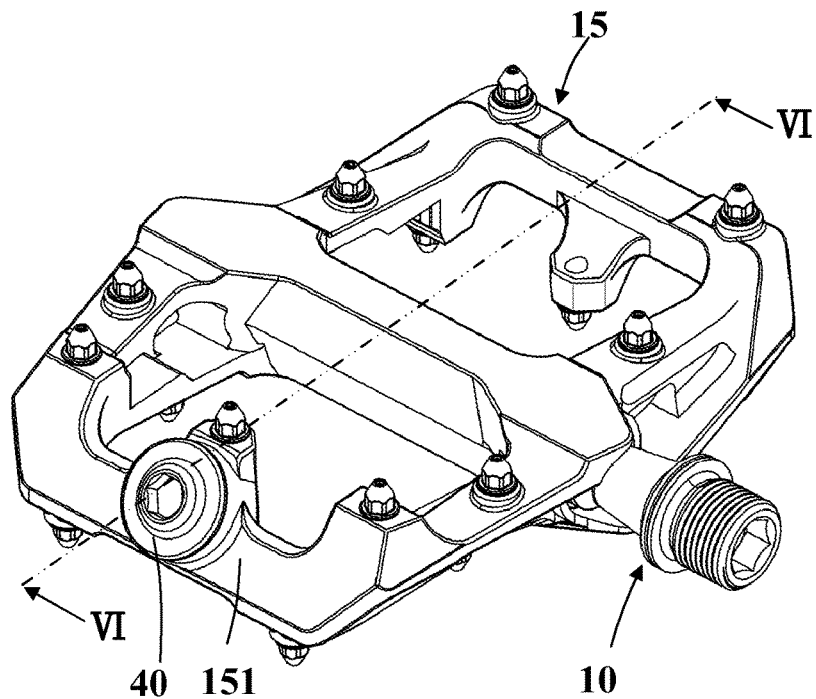
FIG. 5 is a perspective view of a third embodiment of a bicycle pedal with cadence sensor of the present invention.
Figure 6:
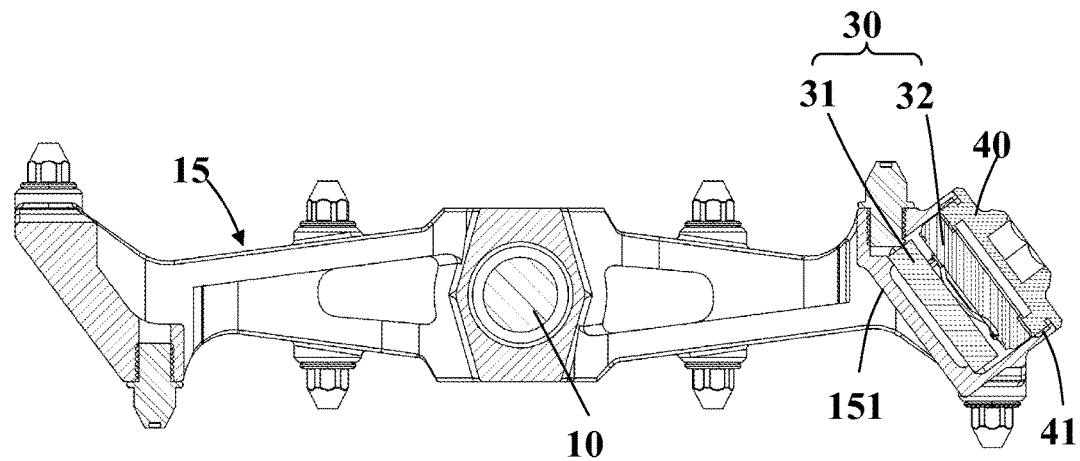
FIG. 6 is a cross-sectional view of the third embodiment of a bicycle pedal with cadence sensor of the present invention.

Please refer to FIGS. 4 to 6, the cadence sensor 30 is arranged at the frame 15 with a third manner. The frame 15 has a receiving portion 20. The receiving portion 20 is arranged at a frame body 151 of the frame 15. Preferably, the receiving portion 20 is arranged at an off tread surface of the frame 15. The off tread surface means a front side surface or a rear side surface of the frame 15. The receiving portion 20 is groove which is concavely formed at the frame 15. The cadence sensor 30 is arranged in the receiving portion 20. An opening of the receiving portion 20 is covered by the stopper 40. An outside part of the stopper 40 and an inner wall of the receiving portion 20 have the threads 41 so that the stopper 40 is screwed in the receiving portion 20 with the threads 41. Or the stopper 40 is made by the elastic materials to tightly plug in the opening of the receiving portion 20. The stopper 40 is covered the receiving portion 20 and consequently the cadence sensor 30 is limited in the receiving portion 20.

Based on above manners, the cadence sensor 30 is arranged at the frame 15. The cadence sensor 30 is cooperating with the frame 15 and the rotational speed (that is the cadence information) may be gained through the G-sensor 31. The cadence information may be transmitted to a bicycle computer (not shown) or a smart mobile device (not shown). A cadence data may be resulted by program operation. The cadence data may be provided to analyze and apply.

Based on above manners, the cadence sensor 30 may be firmly arranged inside the frame 15 and protected by the frame 15 so that they are not influenced by external force or physical environment. The response of the cadence sensor 30 corresponding to the operation of the pedal is high.

Therefore, it is easy to realize that the receiving portion 20 is formed at the frame 15 or the stopper 25 and then the cadence sensor 30 is installed in the receiving portion 20 with general skills.

The receiving portion and the stopper is realized to install the cadence sensor in the pedal, and the battery (power supply) or the G-sensor is convenient to be installed and replaced.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A bicycle pedal with cadence sensor, comprising:
a pedal shaft, fastened at a crank of a bicycle;
a frame, pivotably installed at the pedal shaft; and
a cadence sensor, arranged at the frame, the cadence sensor including a G-sensor and a power supply coupled to the G-sensor, the cadence sensor being arranged in a stopper, and the stopper being received in a receiving portion of the frame, a space formed inside the stopper, an opening of the space arranged at an end portion of the stopper, a pair of embedding members arranged at the end portion, the cadence sensor arranged in the space of the stopper and part of the cadence sensor secured by the embedding members.

2. The bicycle pedal with cadence sensor as claimed in claim 1, wherein the cadence sensor is arranged at a receiving portion formed at a peripheral of the frame.

3. The bicycle pedal with cadence sensor as claimed in claim 2, wherein the receiving portion is arranged at an end portion of an axle of the frame.

4. The bicycle pedal with cadence sensor as claimed in claim 2, wherein the receiving portion is arranged in a frame body of the frame.

5. The bicycle pedal with cadence sensor as claimed in claim 4, wherein the receiving portion is arranged at one side of the frame body.

6. The bicycle pedal with cadence sensor as claimed in claim 4, wherein the receiving portion is covered by the stopper.

7. The bicycle pedal with cadence sensor as claimed in claim 6, wherein the stopper is screwed with an opening of the receiving portion.

8. The bicycle pedal with cadence sensor as claimed in claim 1, wherein the stopper is screwed with the receiving portion of the frame.

* * * * *